United States Patent [19]
Malcolm

[11] Patent Number: 6,034,159
[45] Date of Patent: *Mar. 7, 2000

[54] FAST SETTING MULTIPURPOSE BOOKBINDING ADHESIVE WITH EXCELLENT FLEXIBILITY

[75] Inventor: David B. Malcolm, Maplewood, Minn.

[73] Assignee: H.B. Fuller Licensing & Financing, Inc., St. Paul, Minn.

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/675,062

[22] Filed: Jul. 3, 1996

Related U.S. Application Data

[63] Continuation-in-part of application No. 08/369,739, Jan. 6, 1995, abandoned.

[51] Int. Cl.[7] ............................. C08K 5/10; C08L 91/06; C08L 93/04; C08L 53/02
[52] U.S. Cl. .......................... 524/293; 524/271; 524/274; 524/487; 524/488; 524/489; 524/505; 525/98; 525/99
[58] Field of Search ..................................... 524/271, 274, 524/293, 487, 488, 489, 505; 525/98, 99

[56] References Cited

U.S. PATENT DOCUMENTS

| | | | |
|---|---|---|---|
| 3,635,861 | 1/1972 | Russell | 524/271 |
| 4,345,349 | 8/1982 | Flanagan | 524/505 |
| 4,942,195 | 7/1990 | Flanagan et al. | 524/294 |
| 5,057,571 | 10/1991 | Malcolm et al. | 524/271 |
| 5,091,454 | 2/1992 | Arendt | 524/293 |
| 5,372,870 | 12/1994 | Diehl et al. | 525/98 |
| 5,387,623 | 2/1995 | Ryan et al. | 523/128 |

*Primary Examiner*—Peter A. Szekely
*Attorney, Agent, or Firm*—Lisa L. Ryan

[57] ABSTRACT

A hot melt adhesive for multipurpose bookbinding comprising a) from about 35% to about 40% by weight of a styrene-isoprene-styrene bloc copolymer; b) from about 25% to about 50% by weight of at least one compatible tackifying resin; c) from about 5% to about 30% by weight of a synthetic high melt point wax; d) from about 5% to about 30% by weight of a solid benzoate plasticizer; e) up to about 25% of a compatible wax; and f) up to about 15% of a compatible polymer.

20 Claims, 7 Drawing Sheets

FAST SETTING MULTIPURPOSE BOOKBINDING ADHESIVE WITH EXCELLENT FLEXIBILITY

CROSS-REFERENCE TO RELATED APPLICATION

This application is a continuation-in-part of application Ser. No. 08/369,739 filed Jan. 6, 1995, now abandoned incorporated herein by reference.

FIELD OF THE INVENTION

This invention relates to a fast setting multipurpose bookbinding adhesive having excellent flexibility which comprises a novel styrene-isoprene-styrene block copolymer, a synthetic high melting point wax, a tackifying resin, and a solid benzoate plasticizer. These adhesives are particularly useful in the graphic arts area for bookbinding applications because of their exceptional "lay flat" characteristics which results from their excellent flexibility.

BACKGROUND OF THE INVENTION

A hot melt adhesive is a thermoplastic material, solid at room temperature, which is applied in its molten form and will adhere to a surface when cooled to a temperature below its melting point. They differ from other liquid adhesives in that they set simply by cooling rather than by chemical curing or the evaporation of a solvent.

Typical hot melt adhesives comprise a backbone polymer or copolymer, a wax, and a tackifying resin. The most commonly used copolymer is ethylene vinyl acetate. The polymer or copolymer is used to impart flexibility and cold temperature resistance to the adhesive.

Tackifying resins are used to promote adhesion and improve the adhesive wet out of the substrates to be bonded. The resins typically used are solids, and are derived from rosin, natural terpene, or petroleum hydrocarbons. Due to their high Tg, solid tackifying resins are detrimental to both the flexibility and to the cold temperature resistance of the adhesive.

The wax is used to reduce the viscosity of the adhesive, increase the rate of set, and increase the heat resistance. Waxes are typically brittle, however, and are detrimental to flexibility and to the cold temperature resistance of the adhesive. Most commonly used waxes are paraffin waxes, microcrystalline waxes, and synthetic high melting point waxes. The latter class includes high density, low molecular weight polyethylene waxes, by-product polyethylene waxes, and Fischer-Tropsch waxes.

In recent years, substantial interest has grown in the bookbinding, publishing and printing industries, and in the graphic arts area generally with respect to the development of improved adhesive compositions which lend themselves, in book bindings and the like, to a quality referred to in the bookbinding industry as "lay flat." "Lay flat" refers to the ability of a hard cover book, paperback book, pocket book, booklet, manual, magazine, catalogue, directory such as a telephone directory, and pamphlet to mention only a few, to be opened and laid on a table top or other flat surface without springing closed or "mousetrapping" back to a closed position due to the rigidity and memory of the adhesive composition used in the backbone or binding of the book. Improved "lay flat" has been especially desirable in the computer industry where instruction manuals are used and hands must be free to manipulate computer keyboards while viewing the manual. Lay flat in also highly desirable for school textbooks.

U.S. Pat. No. 4,942,195 to Flanagan et al. teaches the use of a toughened hot melt adhesive comprising a radial styrene-butadiene block copolymer having a styrene content of greater than about 35% by weight, tackifying resins, and at least one wax diluent for bookbinding applications. This waxy diluent is either a paraffin wax or a microcrystalline wax. Flanagan contemplates the use of up to about 10% by weight of a synthetic high melting point wax such as a Fischer Tropsch wax but does not contemplate the use of more than 5% by weight of such a wax. Fischer Tropsch waxes have been known in the art to be detrimental to "lay flat" characteristics for bookbinding and are generally avoided for such bookbinding applications as one shot and two shot binding.

Reactive hot melt polyurethane adhesives(PUR's) or hot melt moisture cures(HMMC's) have been used to accomplish improved "lay flat" characteristics in books. PUR's depend on the presence of moisture to cure which involves crosslinking to form tough, resilient hot melts. The moisture is obtained from the atmosphere around the PUR and this curing process can take days or weeks. As a result, books are often shipped prior to cure and the books cannot, therefore, be tested for quality control prior to shipment. This may result in books that are not within specification. Cost is also a disadvantage with PUR's.

Surprisingly, the current inventors have found that a synthetic high melting point wax utilized along with a styrene-isoprene-styrene block copolymer, a benzoate plasticizer which is solid at room temperature, and a tackifying resin results in a fast setting hot melt with excellent peels resulting in excellent heat resistance, and excellent flexibility. Surprisingly, this hot melt adhesive exhibits exceptional "lay flat" characteristics for bookbinding applications while maintaining toughness.

SUMMARY OF THE INVENTION

The present invention discloses a multipurpose bookbinding hot melt adhesive comprising a) from about 25% to about 40% by weight of a styrene-isoprene-styrene block copolymer; b) from about 25% to about 50% by weight of at least one compatible tackifying resin; c) from about 5% to about 30% by weight of a synthetic high melt point was; d) from about 5% to about 30% by weight of a solid benzoate plasticizer; e) up to about 25% of a compatible wax; and f) up to about 15% of a compatible polymer.

The adhesives are characterized by viscosities of less than about 10,000 centipoise(cPs) at 175° C. cold crack values of less than about −4° C.(about 25° F.), and preferably less than −7° C.(about 20° F.), and most preferably less than about −9° C.(about 15° F.), elongation at break of greater than about 2200%, yield points of less than about 250 pounds per square inch(psi), Young's Modulus of less than about 3,000 psi, and peels of greater than about 120° C., and preferably peels of greater than about 140° C. resulting in excellent heat resistance.

Application equipment constraints prevent good application of adhesives with viscosities that are greater than about 10,000 cPs. Stringing, nozzle clogging, and inconsistent or poor adhesive application occurs at higher viscosities.

A combination of high percent elongation, low yield point, and low Young's Modulus are shown to have good correlation with excellent "lay flat" characteristics in a finished book.

In addition, these adhesives have ultimate tensile values of greater than about 500 psi indicating that toughness is not being sacrificed to flexibility. It is important that adhesives used for the binding of books, such as for one shot or two shot bookbinding applications, have high tensile strength so that they may impart strength to the finished book.

These adhesives are further characterized by excellent flexibility at both ambient and cold temperatures.

The resultant properties of these adhesives make them ideally suited for bookbinding applications especially where good lay flat is required. A combination of high elongation, low yield point, and low Young's Modulus has been correlated with excellent "lay flat" characteristics.

BRIEF DESCRIPTION OF THE DRAWINGS

FIG. 6 through FIG. 8 illustrate the integration of the area between G' and G". An article entitled "DMA Predicts Performance of Bookbinding Adhesives" teaches that the larger the area between the G' and G" curves, the stiffer the product will be. Bamborough, Derek W. and Dunckley, Dr. P. M., *Adhesives Age,* November, 1990, pp. 21–26. Using this interpretation, one would predict that Example 1, having the largest area between G' and G" curves would be more rigid or stiff than Comparative Example A or B. It is surprising, therefore, that in fact i is more flexible.

DETAILED DESCRIPTIONS OF THE PREFERRED EMBODIMENTS

Figure 1:
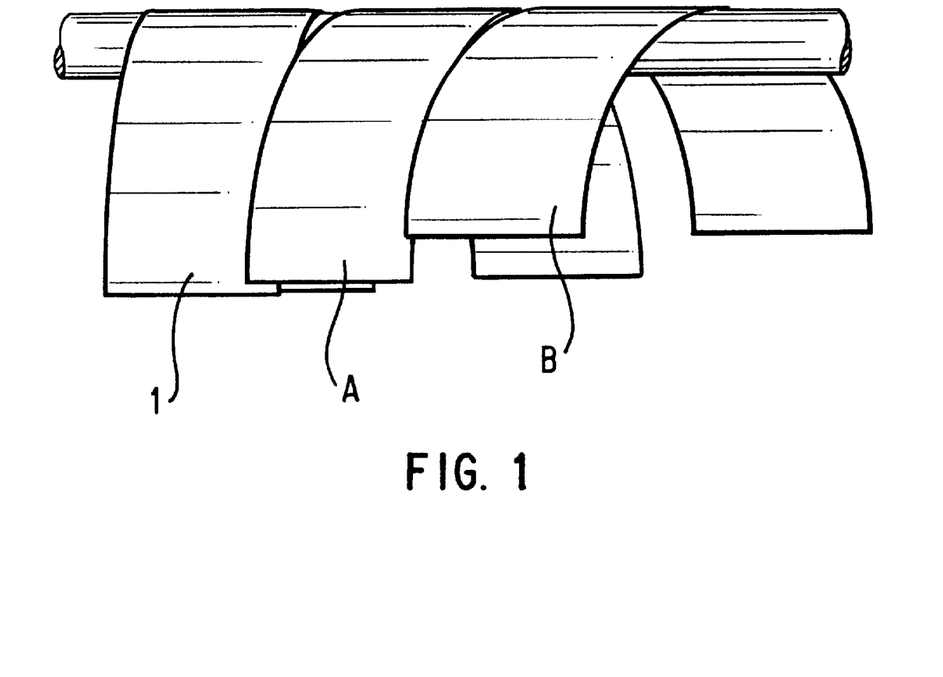
FIG. 1 shows a diagram of three films hanging over a metal rod having a diameter of 1 cm. Each film is 7½×25½ cm. Example 1 shows a composition of the invention while Comparative Examples A and B illustrate the same formula utilizing two different styrene-butadiene-styrene block copolymers. The formulas with the block copolymers are much less flexible than the composition of the invention utilizing a radial styrene-isoprene-styrene block copolymer.
Figure 2:
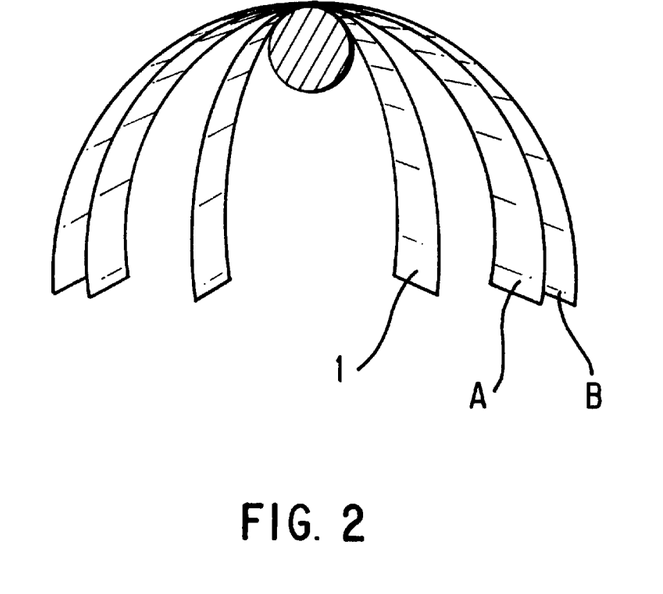
FIG. 2 illustrates the sample principle as FIG. 1 but from a different viewpoint.
Figure 3:
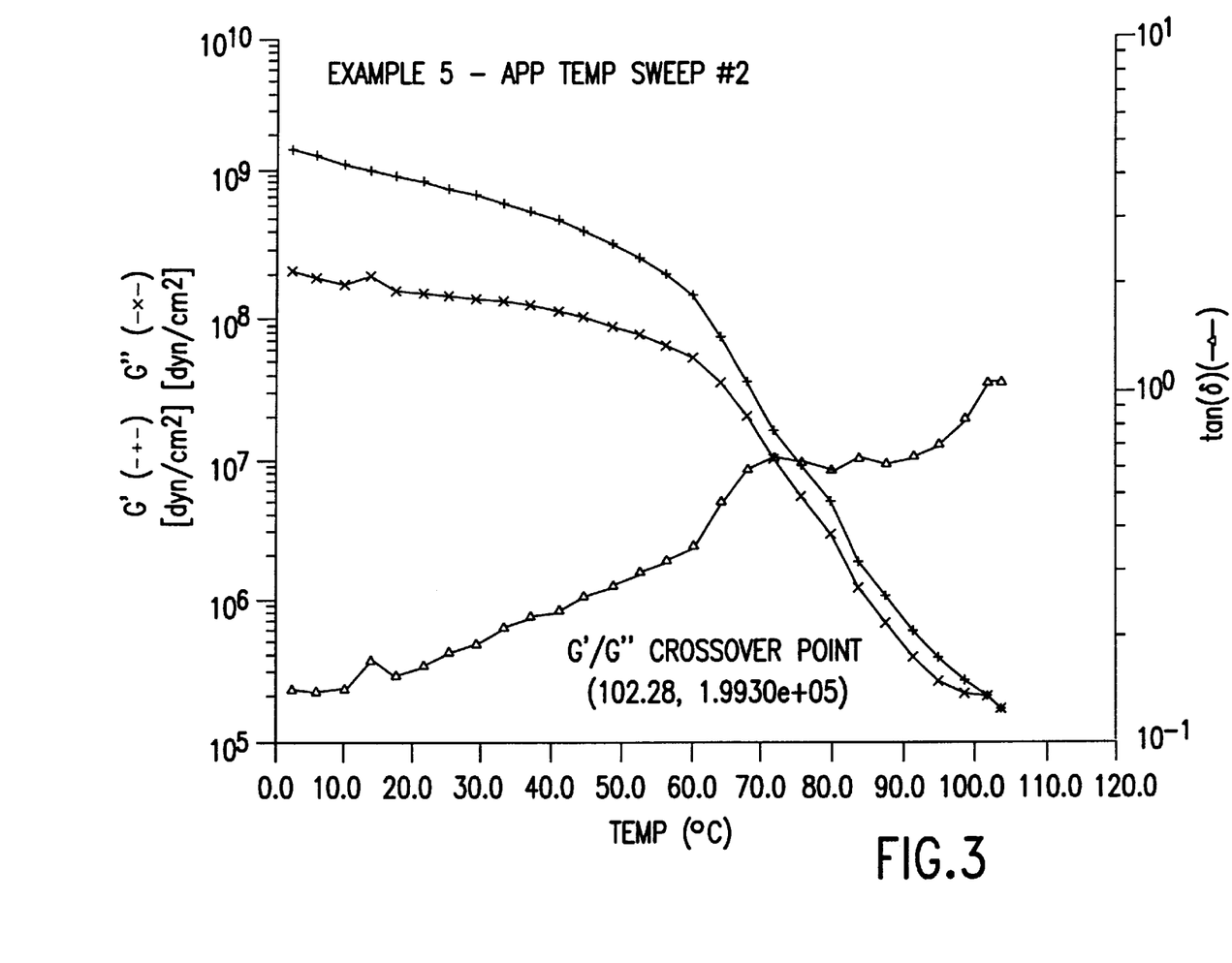
FIG. 3 through FIG. 5 show storage modulus, G' and loss modulus, G" curves for Example 1 and Comparative Examples A and B. It is surprising that these curves show the rates of set to be similar for the three products in light of the fact that Example 1 has been shown to be more flexible than either Comparative Example A or Comparative Example B. It is generally found that as the flexibility of the adhesive increases, the rate of set decreases.
Figure 4:
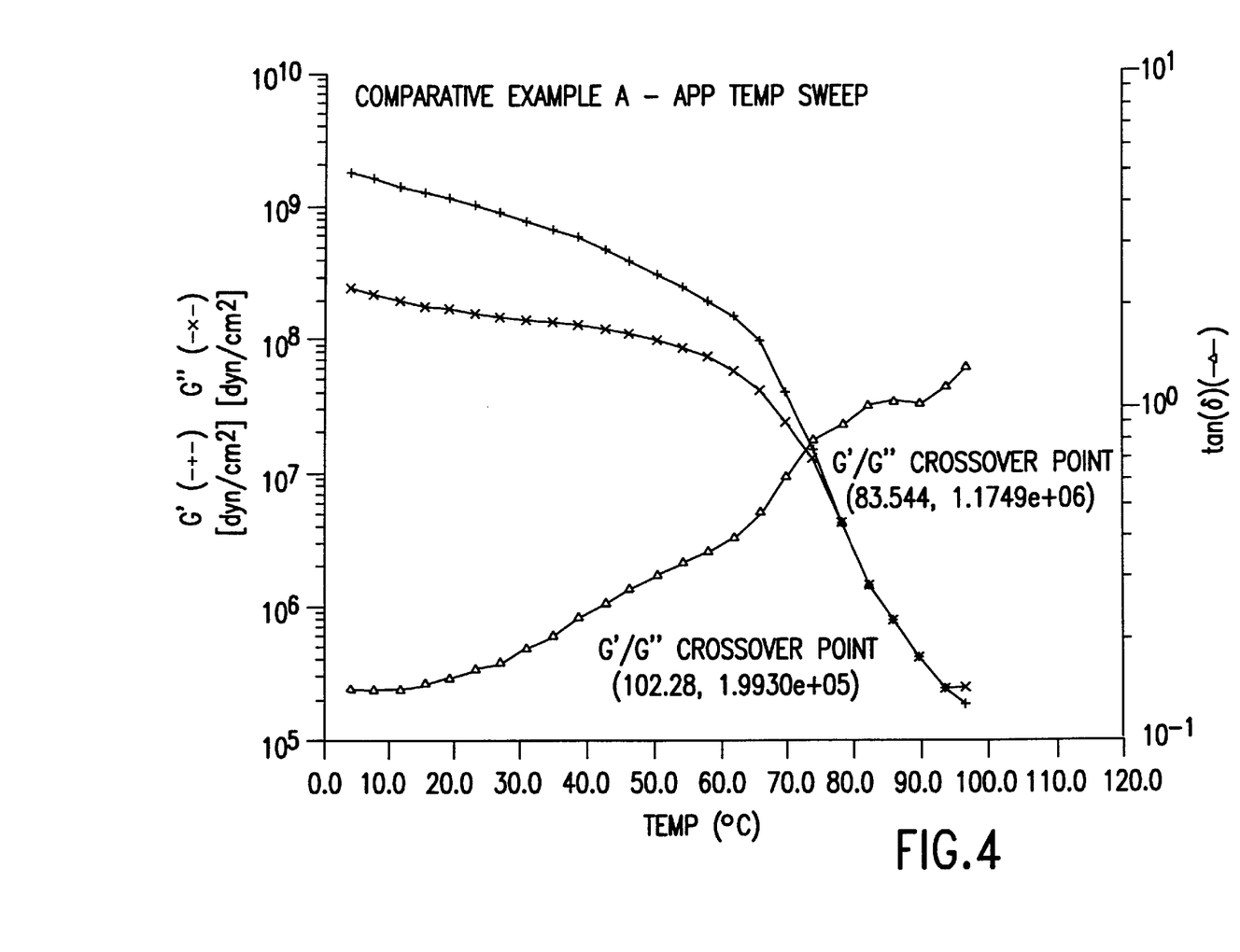
Figure 5:
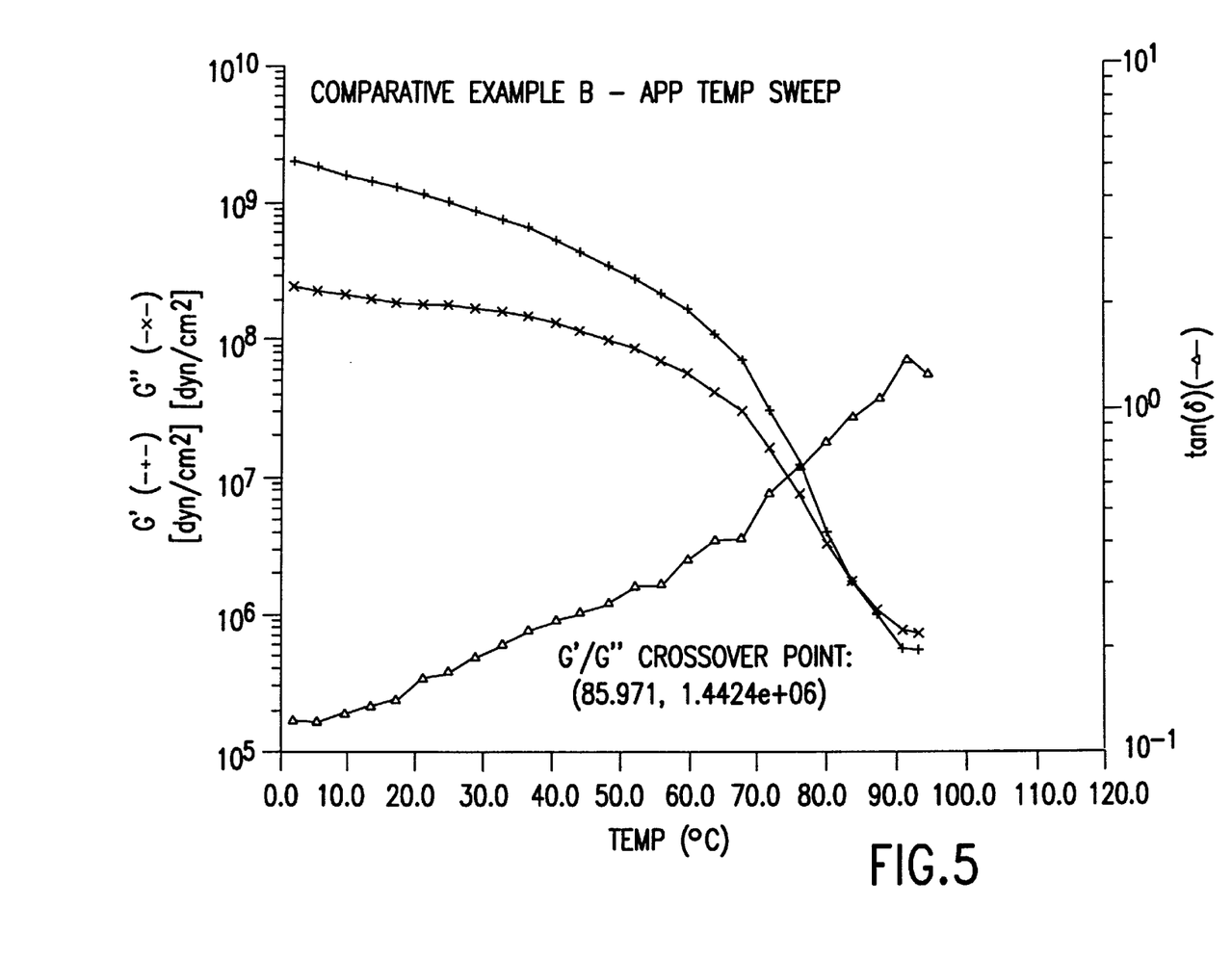
Figure 6:
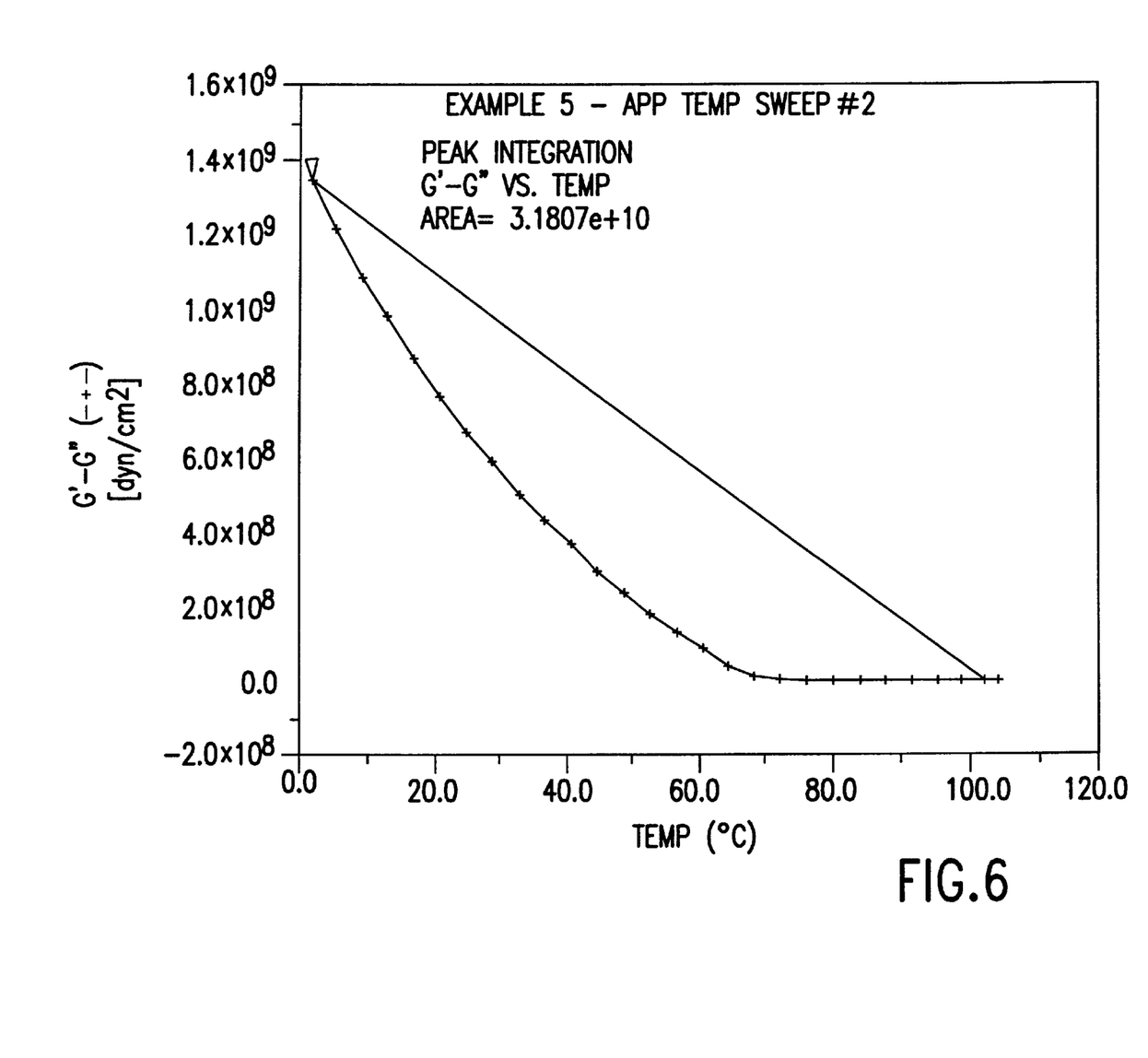
Figure 7:
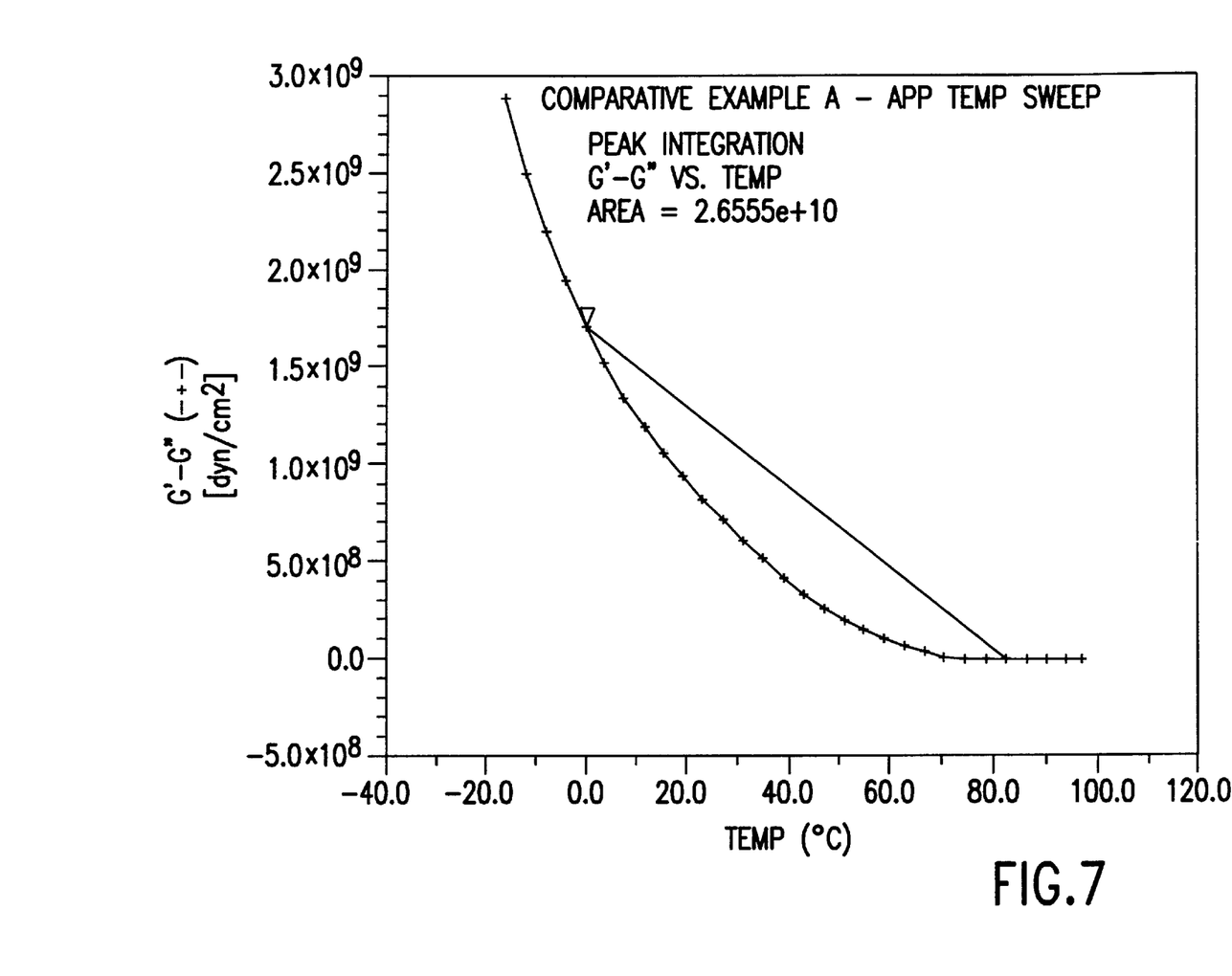
Figure 8:
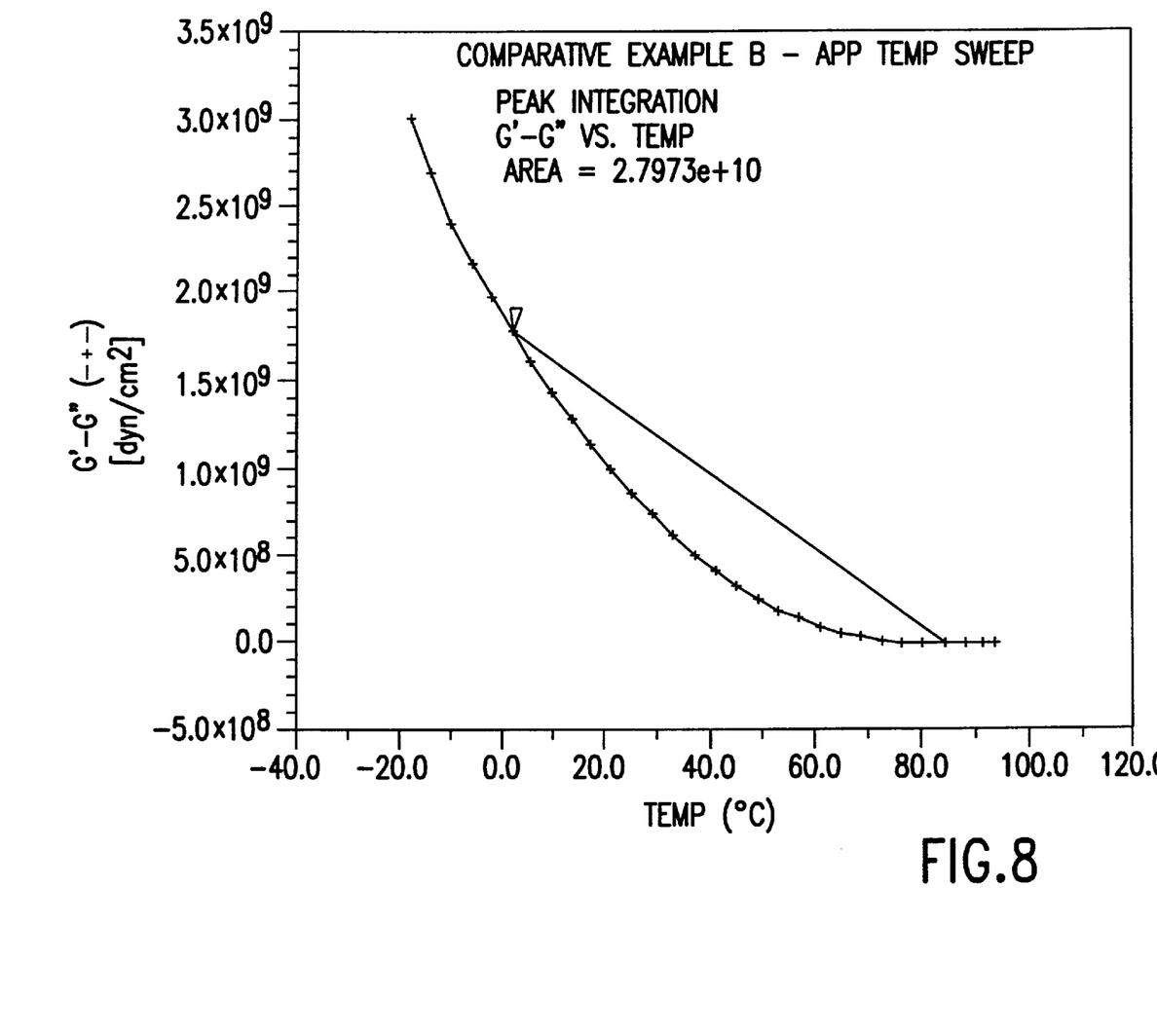

The block copolymers useful herein may include those with a linear A-B-A configuration wherein A is a polystyrene endblock and B is a polyisoprene midblock as well as radial styrene-isoprene-styrene(SIS) block copolymers having the general configuration (pS-pI-pB)$_n$X or (pS-pI)$_n$X where pS is polystyrene, pI is polyisoprene, pB is polybutadiene, X is a residue of a multifunctional coupling agent used in the production of the radial block copolymer, and n is a number greater than 2 representing the number of branches appended to X which may also be referred to as arms. The endblocks of the molecule contribute the hardness and heat resistance to the block copolymer while the midblocks contribute the softness and tack properties, as well as the flexibility and cold temperature resistance to the block copolymer. The number average molecular weight of these polymers may range from about 70,000 to about 380,000. Molecular weights will be chosen based on the viscosities desired. However, a lower amount of a higher molecular weight polymer can be used to achieve the same viscosity range when mixed with other lower molecular weight components. The styrene content is between about 15% and about 35%, and preferably between about 20% and about 30%. Higher styrene content block copolymers become very hard and it is difficult to achieve good flexibility.

The coupling efficiencies of these polymers are greater than about 60%, and preferably greater than about 70%. Coupling efficiency refers to the amount of triblock material as compared to diblock material in the block copolymer. The higher the coupling efficiency, the less diblock material in the block copolymer. Diblock material is a polymer that is not terminated by a styrene endblock on both extremes. Diblock material contributes to the tack properties and flexibility but may have a detrimental effect on the strength and heat resistance of the block copolymer. Radial S-I-S block copolymers and linear block copolymers with high coupling efficiencies are the preferred embodiments of this invention.

Useful SIS block copolymers may include Kraton® D-1124 available from Shell Chemical Co. located in Houston, Tex.; DPX-550, DPX-551, and DPX-552 polymers available from Dexco Polymer sin Houston, Tex.; Quintac® SH-108 and Quintac® 3450 available from Nippon-Zeon in Tokyo, Japan; Europrene® Sol T 193A and 193B available from Enichem Elastomers America in Houston, Tex.; and Vector® 4211-D available from Dexco Polymers. These polymers are useful in amounts from about 25% to about 40% by weight, and preferably from about 30% to about 40% by weight.

The tackifying resins useful herein may include aliphatic, cycloaliphatic, and aromatic hydrocarbon resins and hydrogenated derivatives, and mixtures thereof; rosins and rosin derivatives, and terpenes and modified terpenes, and mixtures thereof. These tackifying resins having Ring and Ball softening points of between about 70° C. and 150° C. and are available with differing levels of hydrogenation. Useful examples include Sylvatac® 1103 and Sylvatac® 105NS, pentaerythritol(PE) rosin ester tackifiers available from Arizona Chemical Co. in Panama City, Fla.; Unitac® R-100 Light, a PE rosin ester available from Union Camp in Wayne, N.J.; Permalyn® 305 a PE rosin ester available from Hercules in Wilmington, Del.; Eastotac® H-100 and H-130, partially hydrogenated cycloaliphatic petroleum hydrocarbon resins available from Eastman Chemical Co. in Kingsport, Tenn.; Escorez® 5300 and 5400 partially hydrogenated cyclcaliphatic petroleum hydrocarbon resins, and Excorez® 5600, a partially aromatic modified petroleum hydrocarbon resin all available from Exxon Chemical Co. in Houston, Tex.; Wingtack® Extra, Wingtack® 86, and Wingtack®95, aliphatic, aromatic petroleum hydrocarbon resins available from Goodyear Chemical in Akron, Ohio; Hercolite® 2100 which is a partially hydrogenated cycloaliphatic petroleum hydrocarbon resin available from Hercules: zonatac® 105 Lite which is a styrenated terpene hydrocarbon resin, made from d-limonene limonene available from Arizona Chemical Co.; Nirez® V-2040, a terpene phenolic resin available from Arizona Chemical Co.; Foral® AX, a rosen acid available from Hercules; and Sylvatac® R-85 and Sylvatac® 295, rosin acids available from Arizona Chemical Co. Although any tackifiers may be used, the preferred tackifiers are rosin ester tackifiers or blends using rosin ester tackifiers. These tackifiers are useful in amounts of between about 30% and about 50% by weight.

The waxes useful herein are synthetic high melting point waxes including high density, low molecular weight polyethylene waxes, by-product polyethylene waxes, and Fischer-Tropsch waxes. These waxes have melting points of greater than about 90° C. Preferred waxes include Petrolite® C-4040, Polywax® 1000, 2000, and 3000, low molecular weight polyethylene waxes available from Petrolite Corp. in Tulsa, Okla.; Excomer® H-101, a modified polyethylene wax available from Exxon Chemical Co.; Marcus® 100, 200, and 300, high density, low molecular weight polyethylene waxes and low molecular weight polyethylene by-product waxes available from Marcus Chemical Co., a Division of H.R.D. Corp. and located in Houston, Tex.; and Paraflint® HL, H-1, H-4, and H-8, Fischer-Tropsch waxes available from Sasol-SA/Moore & Munger Marketing located in Shelton, Conn. The waxes are useful in amounts, and preferably between about 5% and about 20% by weight.

Paraffin waxes and microcrystalline waxes may be used in combination with the synthetic high melting point waxes to reduce viscosity and cost.

The paraffin waxes useful herein are those having a Ring & Ball softening point of about 55° C. to about 85° C. The preferred waxes are Okerin® 236TP available from Astor Wax Corporation located in Doraville, Ga.; Penreco® 4913 available from Pennzoil Products Company in Houston, Tex.; R-7152 Paraffin Wax available from Moore & Munger; and Paraffin Wax 1297 available from International Waxes, LTD in Ontario, CAN.

The microcrystalline waxes useful herein are those having about 50% by weight or more cyclo or branched alkanes with a length of between about 30 and 100 carbons. They are generally less crystalline than paraffin and polyethylene waxes, and have melt points of greater than about 70° C. Examples include Victory® Amber Wax, a 70° C. melt point wax available from Petrolite Corp.; Bareco® EX-796 Amber Wax, a 70° C. melt point wax available from Bareco in Chicago, Ill.; Okerin® 177, an 80° C. melt point wax available from Astor Was Corp.; Be Square® 195 Amber Wax, a 90° C. melt point wax available from Industrial Raw Materials located in Smethport, Pa.; and Petrowax® 9508 Light, a 90° C. melt point wax available from Petrowax Pa., Inc. located in New York, N.Y. These waxes are useful in combination with the synthetic high melting point wax in amounts up to about 25% by weight.

The solid plasticizers useful herein are those benzoate plasticizers having a melt point of greater than about 90° C. Examples of useful plasticizers include Benzoflex S-552, a pentaerythritol tetrabenzoate solid plasticizer having a melt point of about 99° C.; and Benzoflex 352, a 1,4-cyclohexane dimethanol dibenzoate solid plasticizer having a melt point of about 118° C. Both are available from Velsicol Chemical Corp. Chattanooga Products Division located in Rosemont, Ill. The purpose of the solid plasticizer is to improve adhesive penetration or wetability by lowering adhesive viscosity and delaying the solidification. This in turn improves the bondability of the adhesive to difficult to bond substrates such as the coated or glossy paper used in the graphic arts industry. Other difficult substrates may include polyethylene, polypropylene, and composite materials. These solid plasticizers contribute to flexibility measured by Young's Modulus, yield point and elongation; and to cold resistance as measured by cold crack, as liquid plasticizers do. However, while liquid plasticizers are detrimental to heat resistance as measured by the peel values, and to toughness as measured by ultimate tensile strengths, these solid plasticizers are not. These solid plasticizers are useful in amounts between about 5% and about 30% by weight, and preferably between about 5% and about 20% by weight.

The compatible polymers useful herein are those selected from the group consisting of A-B-A triblock copolymers, and A-B diblock copolymers, A-B-A-B-A-B multiblock copolymers, and radial block copolymers, and grafted versions thereof; homopolymers, copolymers, and terpolymers of ethylene; and propylene. Block copolymers having the general configuration A-B-A, having styrene endblocks and ethylene-butylene midblocks, described in Collins et al., U.S. Pat. No. 4,136,699, would be useful in amounts up to about 15% by weight in the adhesive. These polymers are available under the tradename of Kraton™ G commercially available from Shell Chemical Co., located in Houston, Tex. One skilled in the art would recognize that there are various grades of Kraton® G available for use. Some examples include Kraton® G-1726, Kraton® G-1657, Kraton® G-1652, and Kraton® G-1650, saturated A-B diblock/A-B-A triblock mixtures with ethylene-butadiene midblocks.

Other compatible S-I-S polymers such as Kraton® D-111, a high percent A-B diblock linear styrene-isoprene-styrene polymer: Kraton® D-1107 and Kraton® D-1111 , primarily A-B-A triblock linear styrene-isoprene-styrene polymers; Kraton D-1117 and D-1125 which are also linear S-I-S block copolymers; Europrene® Sol T 193B a linear styrene-isoprene-styrene polymer available from Enichem Elastomers in New York; Vector® 4111-D and 4411-D, fully coupled linear styrene-isoprene-styrene polymers containing different weight percentages of styrene endblock; and Vector® 4113, a highly coupled linear styrene-isoprene-styrene polymer also available from Exxon Chemical Co. NY would also be useful.

Styrene-butadiene-styrene(S-B-S) polymers may also be used in combination with the S-I-S polymers of the present invention. Stereon® 841a, an A-B-A-B-A-B multiblock styrene-butadiene-styrene polymer available from Firestone located in Akron, Ohio; Europrene® Sol T 163, a radial styrene-butadiene-styrene polymer available from Enichem Elastomers; and Vector® 4461-D, a linear styrene-butadiene-styrene polymer available from Exxon Chemical Co. in Houston, Tex. are some examples of useful S-B-S polymers.

Other polymers, such as homopolymers, copolymers and terpolymers of ethylene, and polypropylene may be useful in amounts up to about 15% by weight in the adhesive. Some examples include ethylene vinyl acetate copolymers such as Elvax® 410 and Elvax® 210 available from DuPont Chemical Co. located in Wilmington, Del.; Escorene®UL 7505 available from Exxon Chemical Co.; Ultrathene® UE 64904 available from Quantum Chemical Corp. in rolling Meadows, Ill.; and AT 1850M available from AT Polymers & Film Co. in Charlotte, N.C. Other useful polymers include Exact® 5008, an ethylene-butene butene polymer; Exxpol® SLP-0394, an ethylene-propylene polymer; Exact® 3031, an ethylene-hexene polymer all available from Exxon Chemical Co.; and Insight® SM-8400, an ethylene-octene polymer available from Dow Chemical Co. located in Midland, Mich. These polymers are useful up to about 15% by weight.

A stabilizer or antioxidant is also preferably used in hot melt adhesives. These compounds are added to protect the adhesive from degradation caused by reaction with oxygen induced by such things as heat, light, or residual catalyst from the raw materials such as the tackifying resin. Such antioxidants are commercially available from Ciba-Geigy Hawthorne, N.Y. and include Irganox® 565, Irganox® 1010 and Irganox® 1076 which are hindered phenols. These are primary antioxidants which act as radical scavengers and may be used alone or in combination with other antioxidants such as phosphite antioxidants like Irgafos® 168 available from Ciba-Geigy. Phosphite catalysts are considered secondary catalysts and are not generally used alone. These are primarily used as peroxide decomposers. Other available catalysts are Cyanox® LTDP available from Cytec Industries in Stamford, Conn., and Ethanox® 1330 available from Albemarle Corp. in Baton Rouge, La. Many such antioxidants are available either to be used alone or in combination with other such antioxidants. These compounds are added to the hot melts in small amounts and have no effect on the other physical properties. Other compounds that could be added that also do not affect physical properties are pigments which add color, or fluorescing agents, to mention only a couple. Additives like these are known to those skilled in the art.

These adhesives are characterized by viscosities of less than about 10,000 cPs at 175° C. cold crack values of less than about −4° C.(about 25° F.), preferably less than about −7° C.(about 20° F.), and most preferably less than about −9° C.(about 15° F.), and peels of greater than about 120° C., and preferably greater than about 140° C. The low cold crack values and high peels indicate excellent heat resistance and cold temperature flexibility.

The excellent flexibility of these adhesives can be quantified by elongation values at break of greater than about 2200%, yield points of less than about 200 psi and Young's Modulus of less than about 4,000 psi. A combination of high elongation, low yield point, and low Young's Modulus has been correlated with excellent "lay flat" characteristics for bookbinding applications. These adhesives are further characterized by ultimate tensile values of greater than about 500 psi indicating that these adhesives remain tough even though they are highly flexible.

The fact that the formulas remain flexible while containing high amounts of the synthetic high melting point wax is a very surprising result. Synthetic high melting point waxes are known in the art to stiffen the hot melt dramatically causing poor resistance to cold temperatures. Stiffness at cold temperatures may result in a weakening or even failure of the bond, and may even result in the hot melt breaking into pieces or shattering. In more dramatic cases, these results can be seen even at ambient or room temperature. This can be seen by measuring the cold crack of the adhesives. Another surprising result of this invention is that the cold crack of a styrene-butadiene-styrene block copolymer based hot melt adhesive is raised by the presence of a synthetic high melting point wax while the styrene-isoprene-styrene block polymer based hot melt adhesive can contain substantial amounts of synthetic high melting point wax and still maintain excellent cold crack resistance.

The characteristics of these hot melt adhesives lend themselves to multipurpose bookbinding adhesives. "Lay flat" is important in one shot and two shot bookbinding.

One shot bookbinding is the most common method by which books are bound. Using this method, the sheets or signatures which make up a book are collated or stacked and are then held in a clamp to form a book block. Adhesive is then applied to the backbone or spine of the book block using, for example, a two or three wheel glue pot. The rollers are immersed in a reservoir of hot melt adhesive which is generally maintained at a constant temperature of about 175° C. The rollers provide mechanical action which enables the adhesive to penetrate into and between the paper, and also to control the amount of adhesive applied to the book. One shot bookbinding adhesives must be tough to impart strength to the book, and flexible to allow for good "lay flat" in the finished book.

Two shot bookbinding is also commonly used to bind books. In this case, the book block is initially bound using a primer adhesive which is typically a water based adhesive but may also be a hot melt adhesive. This adhesive is the first shot. These adhesives must be low in viscosity, and have good adhesion to difficult to bond paper stocks. The purpose of the primer is to provide greater penetration into the paper. If a water based adhesive is employed, then the book backbone may be passed over burners or heaters to decrease the drying time. A second adhesive known as a covering adhesive or second shot, typically a hot melt adhesive, is then applied using a two or three wheel glue applicator, to the book backbone. This adhesive is used ti impart toughness to improve the strength of the book. It also must be flexible to impart good "lay flat" characteristics to the finished book. The bookbinding process is then completed using the application of capping paper, cheese cloth or crash, and draft paper prior to application of the cover.

These adhesives also lend themselves to casing-in and casemaking. Casing-in is typically accomplished using a water based emulsion. During the casing-in process, a book block is laminated to the inside of the cover of a hard bound book by coating the outside of the end sheets of the book block with the adhesive, and then bonding the cover to the end sheets. The high amount of water present in these water based systems can be detrimental to a finished book. It may result in cockeling or waviness in the end sheets as the paper expands and contracts due first to saturation with water, and then drying as the water evaporates. Moisture can also migrate and travel inward causing warpage of the first or last twenty pages of the book. Unsightly curvature of the cover in relation to the book block can result as can lack of register of the cover with the book block. The adhesives of the invention contain no water, but also do not contain oil or other plasticizers which can also migrate into the book and result in staining of the end sheets or cover. Hot melt adhesives are not currently used for this process and heated reservoirs would be required to maintain a constant adhesive temperature of about 150° C. to about 175° C. Heated rollers may also be used. Optionally, other means could be used to apply the adhesive such as beads extruded by means of nozzles, fine line application such as that used in the manufacture of disposable diapers, and spray type applications such as spiral spray. The main concern here would be to apply a fine enough bead or spray pattern so as to eliminate any bulges that may result from the hot melt adhesive. Other modes of application may also be contemplated.

Casemaking refers to the production of the case or cover of the hard bound book. During this process, the material that forms the outer covering of the book is bonded to binder boards to form a "hard" cover. The material used may be cloth, paper, leather, vinyl, polyethylene, composite materials such as paper or cloth laminated to polyethylene, polyester, or "mylar," and polypropylene. Many other materials not mentioned here may also be useful for making book covers.

The covering material, which is either in precut form or in continuous web form, depending on the type of application equipment used, is passed along a conveyor during which time binder boards, which are usually precut, are mated onto the adhesive coated covering material. The surplus covering material is folded over on to the binder board in a two step process known as "turning in" in which either the sides are folded in first and the ends are folded in second resulting in an overlap of the ends over the sides, or the ends are folded in first and the sides second. These are also called "turn-ins." "Animal glues" are typically used for this process, although water based emulsions may also be used. Animal glue is an amorphous organic colloid derived from animal protein and extended with various plasticizers including water, in amounts of between 40% and 50% by weight. It is typically applied using a roller which is supplied adhesive from a reservoir heated to between about 60° C. and 85° C. This roller then transfers it to one or two other rollers which ultimately come into contact with the covering material. Water based emulsions do not require heat, but are applied in a similar fashion. Both of these types of adhesives contain substantial amounts of water, and moisture from the adhesives can migrate into the binding board from the adhesive resulting in warpage of the cover. The adhesives of the present invention again contain no water, and no oils or plasticizers which can result in unsightly staining of the cover. While hot melt adhesives may be applied in a similar fashion, the use of heated reservoirs would be required.

The invention is further illustrated by the following nonlimiting examples.

EXAMPLES

Test Methods

1. Tensile and Elongation, Young's Modulus, Yield Point

The tensile and elongation, Yield Point, and Young's Modulus are determined using ASTM D-638. The die used is an ASTM D-638 Type 4 die. A one inch gauge with a video extensometer is used to monitor elongation. The strain rate used is 25.4 cm/minute. Young's Modulus is a method of ranking the relative flexibility of adhesive films. The film thickness used is 20–25 mils. The resistance to tensile deformation is measured at small strains.

2. Peel and Shear

Peel and shear values are determined by placing samples in a programmed oven with 100 g weight used for the peel mode and 500 g weights used for the shear mode, and ramping the temperature up from about 25° C. to 175° C. at 25° C./hour. The oven automatically recorded the temperature at which the samples failed. Each sample was coated onto kraft paper by hand using glass rods or shims. The resultant coating is a one inch wide band that is about 8–10 mils or about 0.02 cm to about 0.03 cm thick. Four to five bonds were made for the peel mode and four to five bonds were made for the shear mode and the results were averaged.

3. Cold Crack

Films with a thickness of 20–30 mils are prepared by hand using a glass rod or shim. Several samples that are 2.54 cm(1 inch)×7.62 cm (3 inches) are cut from the film. The samples are placed on a base in a freezer at 10° C. for one hour. The base is made from a rigid plastic and has a trough that is cut into the base at a 90° angle. After one hour a pressure bar, that is cut to exactly fit the base, is forced into the samples. The cold crack is the temperature at which the 1 inch×3 inch sample fails. The temperature is decreased by about 2.8° C. every hour until the adhesive fails.

4. Melt Viscosities

The melt viscosities of the hot melt adhesives were determined on a Brookfield Thermosel Viscometer Model using a number 27 spindle.

5. Dynamic Mechanical Analysis

ASTM Method D 4440 is used to determine Storage (elastic), G' and loss(viscous), G" moduli as a function of temperature. The frequency used is 10 radians/second and the temperature sweep is from about 100° C. to about 0° C.

The adhesive samples were prepared using a high shear Sigma blade mixer, such as those manufactured by Littleford Day located in Florence, Ky. These adhesives may also be prepared suing ribbon blenders, Daymax mixers, and twin screw extruders. The mixer, heated to a temperature of about 150° C. to abut 175° C., is charged with approximately one-half of the resin which is then allowed to melt. The block copolymer(s) are then slowly added and allowed to shear until the mixture is smooth. The remaining resin and wax is then very slowly added and allowed to mix until smooth.

TABLE 1

| Adhesive Components (% by weight) | Example 1 | Example 2 | Example 3 | Example 4 |
|---|---|---|---|---|
| Vector 4211D (SIS) | 35 | 35 | 30 | |
| Paraflint H-4 (HMP Wax) | 15 | 5 | | 12.5 |
| XR-4083 (Rosin ester) | 40 | 40 | 45 | 37.5 |
| Benzoflex 352 (Plasticizer) | 10 | 20 | 20 | 15 |
| Polywax 3000 (Wax) | | | 5 | |
| Kraton D-1124 (SIS polymer) | | | | 35 |
| Bookbinding Application Type | One Shot or Two Shot | Casing-in | Case-making | Two Shot |

Table 1 illustrates the type of formula that may be preferred for different bookbinding applications.

TABLE 2

| Adhesive Components (% by weight) | Example 5 | Comparative A | Comparative B |
|---|---|---|---|
| Stereon 841 (SBS tapered block) | | 35.0 | |
| Kraton D-1122 (SBS radial) | | | 35.0 |
| Kraton D-1124 (SIS radial) | 35.0 | | |
| Benzoflex 352 (crystalline solid plasticizer) | 5.0 | 5.0 | 5.0 |
| Paraflint H-4 (HMP Fischer Tropsch) | 20.0 | 20.0 | 20.0 |
| Unitac R-100Lt (rosin ester) | 37.0 | 37.0 | 37.0 |
| Antioxidant 1% hindered phenols | 1.0 | 1.0 | 1.0 |
| RM-6060 (coextrusion coating) | 2.0 | 2.0 | 2.0 |
| Viscosity (cps) | | | |
| 300° F. | 52,500 | 24,850 | 41,800 |
| 325° F. | 18,800 | 13,700 | 19,500 |
| 350° F. | 8,115 | 8,000 | 11,000 |
| 375° F. | 4,065 | 5,215 | 6,750 |
| 400° C. | 2,390 | 3,635 | 4,640 |
| 100 g Peel (° F.) | 148 | 145 | 149 |
| 500 g Shear (° F.) | 169 | 163 | 170 |
| Cold Crack (° F.) | 15 | 25 | 20 |
| Ultimate Tensile (psi) | 590 | 460 | 1,000 |
| Yield Point (psi) | 85 | 290 | 290 |
| % Elongation at Break | 2,530 | 2,110 | 1,550 |

TABLE 2-continued

| Adhesive Components (% by weight) | Example 5 | Comparative A | Comparative B |
|---|---|---|---|
| Youngs Modulus (psi) | 1,070 | 10,000 | 4,950 |
| Relative Flexibility | Most Flexible | Least Flexible | Med. Flexible |

RM-6060 is a coextrusion coating added to the outside of the hot melt adhesive for shipping and handling purposes to prevent blocking of the hot melt adhesive during shipping and use. It is available from the H. B. Fuller Co. in St. Paul, Minn. The antioxidant may be Irganox® 1010 or 1076 available from Ciba Geigy in Hawthorne, N.Y. Neither of these ingredients affects the performance characteristics.

Table 2 illustrates the superior heat resistance that may be achieved with the compositions of the present invention as measured by peels and shears, while maintaining excellent cold temperature flexibility as measured by cold crack, when comparing similar formulations using other types of block copolymers. It further illustrates the low yield point, high percent elongation at break, and low Young's Modulus indicating excellent flexibility which leads to excellent "lay flat" for finished books. Surprisingly, tensile strength which is an indication of toughness, has not been sacrificed in gaining excellent flexibility. The viscosity curve is also in the range for good adhesive application. This table also illustrates that styrene-butadiene-styrene block copolymers are more negatively affected by the presence of a high melt point synthetic wax than the SIS polymer as indicated by higher cold crack values, higher yield points, lower percent elongation at break, and higher Young's Moduli for the SBS block copolymer based compositions.

TABLE 3

|  | Example 6 | Example 7 | Comp. C | Comp. D | Comp. E |
|---|---|---|---|---|---|
|  | 39-1 | 40-1 | 39-2 | 39-3 | 40.2 |
| Stereon 841A | — | — | 35.0 | — | — |
| Kraton D-1124 | 35.0 | 35.0 | — | 35.0 | 35.0 |
| Benzoflex 352 | 20.0 | 20.0 | 20.0 | — | — |
| DCHP | — | — | — | 20.0 | 20.0 |
| HMP Wax - Paraflint H-4 | 5.0 | 5.0 | 5.0 | 5.0 | 5.0 |
| Unitac R-100Lt | 37.0 | 18.5 | 37.0 | 37.0 | 18.5 |
| Eastotac H-100R | — | 18.5 | — | — | 18.5 |
| Irganox 1010 | 0.5 | 0.5 | 0.5 | 0.5 | 0.5 |
| Irganox 565 | 0.5 | 0.5 | 0.5 | 0.5 | 0.5 |
| RM-6060 | 2.0 | 2.0 | 2.0 | 2.0 | 2.0 |
| 100 g Peel Kraft/Kraft |  |  |  |  |  |
| 24 hours | 140 | 148 | 126 | 121 | 123 |
| 48 hours | 137 | 148 | 132 | 120 | 118 |
| 72 hour | 152 | 147 | 136 | 126 | 121 |
| 150 hours | 148 | 149 | 136 | 126 | 122 |

RM-6060 is available from the H. B. Fuller Co. in St. Paul, Minn. DCHP is a dicyclohexyl ester available under the tradename of Morflex® 150 and is manufactured by Morflex Inc. located in Greensboro, N.J.

Table 3 illustrates the high peels obtained using the SIS block copolymer in combination with a tackifier, high melt point wax, and solid benzoate plasticizer. In contrast, using a different type of solid plasticizer, dicyclohexyl phthalate (DCHP) does not achieve the same high heat resistance. This table also shows how peels may increase over time with the use of the solid benzoate plasticizers of the invention until they reach a steady state after about 72 hours. Example 3, with the use of a hydrocarbon resin, causes the peels to level much more quickly. Surprisingly, Table 3 also illustrates, with the use of Comparative Example C, that the heat resistance of an adhesive using a tapered block SBS polymer is lower as indicated by the lower peel values.

I claim:

1. A hot melt adhesive for multipurpose bookbinding comprising:
    a) from about 25% to about 40% by weight of a styrene-isoprene-styrene block copolymer having a styrene content between about 15% and about 35% by weight;
    b) from about 25% to about 50% by weight of at least one compatible tackifying resin selected from the group consisting of rosins and rosin ester; terpenes and modified terpenes; aliphatic, cycloaliphatic and aromatic hydrocarbons; hydrogenated derivatives and mixtures thereof;
    c) from about 10% to about 30% by weight synthetic high melting point wax, said high melt point wax having a melting point of greater than about 90° C.;
    d) from about 5% to about 30% by weight of a solid benzoate plasticizer;
    e) up to about 25% of a compatible wax selected from the group consisting of paraffin wax, microcrystalline wax and mixtures thereof; and
    f) up to about 15% of a compatible polymer selected from the group consisting of homopolymers, copolymers and terpolymers of ethylene; homopolymers, copolymers and terpolymers of propylene; rubbery block copolymers and mixtures thereof.

2. The adhesive of claim 1 made by the process comprising the steps of:
    a) melting the adhesive components; and
    b) blending the adhesive components until smooth and homogeneous; wherein the melting and blending of each component may occur in any order of addition.

3. The adhesive of claim 1 wherein the styrene-isoprene-styrene block copolymer is a radial block copolymer having the general configuration $(pS-pI-pB)_nX$ or $(pS-pI)_nX$ wherein pS is polystyrene, pI is polyisoprene, pB is polybutadiene, X is a residue of a multifunctional coupling agent and n is a number greater than 2, said block copolymer having a number average molecular weight from about 90,000 to about 380,000.

4. The adhesive of claim 1 wherein the styrene-isoprene-styrene block copolymer is a linear polymer having the general configuration A-B-A where a is the styrene endblock and B is the isoprene midblock, said block copolymer having a number average molecular weight of greater than about 70,000 grams per mole.

5. The adhesive of claim 1 wherein the synthetic high melt point wax is selected from the group consisting of polyethylene waxes and Fischer-Tropsch waxes.

6. The adhesive of claim 1 wherein the solid benzoate plasticizer is 1,4-cyclohexane dimethanol dibenzoate.

7. The adhesive of claim 1 wherein at least one tackifying resin is a rosin ester.

8. The adhesive of claim 1 wherein the viscosity is less than about 10,000 cPs at about 175° C.

9. The adhesive of claim 1 wherein the cold crack value is less than about −7° C.(about 20° F.).

10. The adhesive of claim 1 wherein Young's Modulus is less than about 2,500 psi.

11. The adhesive of claim 1 wherein the elongation at break is greater than about 2200%.

12. The adhesive of claim 1 wherein the yield point is less than about 250 psi.

13. The adhesive of claim 1 wherein the peels are greater than about 60° C.

14. A multipurpose hot melt bookbinding adhesive comprising from about 30% to about 40% by weight of a styrene-isoprene-styrene block copolymer; from about 30% to about 40% by weight of at least one tackifying resin selected from the group of rosins and rosin esters; from about 10% to about 20% by weight of synthetic high melting point wax having a melt point of greater than about 90° C.; and from about 5% to about 20% by weight of a benzoate plasticizer which is a solid at ambient temperatures; wherein Young's Modulus is less than about 2,500 psi, elongation at break is greater than about 2200%, and the yield point is less than about 250 psi resulting in excellent "lay flat."

15. A hot melt adhesive for multipurpose bookbinding comprising:
   a) from about 25% to about 40% by weight of at least one styrene-isoprene-styrene block copolymer;
   b) from about 25% to about 50% by weight of at least one compatible tackifying resin;
   c) from about 10% to about 30% by weight of a synthetic high melt point wax having a melt point of greater than about 90° C.; and
   d) from about 5% to about 30% b weight of a solid benzoate plasticizer.

16. The adhesive of claim 15 further comprising up to about 25% by weight of a compatible wax.

17. The adhesive of claim 15 further comprising up to about 15% by weight of a compatible polymer.

18. The adhesive of claim 15 wherein the tackifying resin is selected from the group consisting of rosins and rosin esters; terpenes and modified terpenes; aliphatic, cycloaliphatic and aromatic hydrocarbons and mixtures thereof; hydrogenated derivatives; and mixtures thereof.

19. The adhesive of claim 15 wherein the styrene content of the styrene-isoprene-styrene block copolymer is from about 15% to about 35% by weight of the block copolymer.

20. The adhesive of claim 15 wherein the said benzoate plasticizer is 1,4-cyclohexane dimethanol dibenzoate.

* * * * *